(12) United States Patent
Driess et al.

(10) Patent No.: US 11,530,140 B2
(45) Date of Patent: Dec. 20, 2022

(54) USE OF KEPLERATE TYPE POLYOXYMOLYBDATES FOR DECONTAMINATING AQUATIC ENVIRONMENTS

(71) Applicant: TECHNISCHE UNIVERSITÄT BERLIN, Berlin (DE)

(72) Inventors: Matthias Driess, Berlin (DE); Reinhard Schomäcker, Berlin (DE); Garai Somenath, Berlin (DE); Martin Gross, Bernau (DE); Amitava Acharjya, Berlin (DE); Michael Schwarze, Berlin (DE); Prashant Menezes, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 0 days.

(21) Appl. No.: 16/753,391

(22) PCT Filed: Sep. 29, 2018

(86) PCT No.: PCT/EP2018/076551
§ 371 (c)(1),
(2) Date: Apr. 3, 2020

(87) PCT Pub. No.: WO2019/068593
PCT Pub. Date: Apr. 11, 2019

(65) Prior Publication Data
US 2020/0331774 A1    Oct. 22, 2020

(30) Foreign Application Priority Data
Oct. 5, 2017 (EP) .................................... 17195084

(51) Int. Cl.
| | |
|---|---|
| *C02F 1/30* | (2006.01) |
| *B01J 23/881* | (2006.01) |
| *B01J 35/00* | (2006.01) |
| *C02F 1/72* | (2006.01) |
| *C02F 101/10* | (2006.01) |
| *C02F 101/30* | (2006.01) |
| *C02F 101/32* | (2006.01) |
| *C02F 101/38* | (2006.01) |
| *C02F 103/00* | (2006.01) |
| *C02F 103/14* | (2006.01) |
| *C02F 103/30* | (2006.01) |
| *C02F 103/34* | (2006.01) |
| *C02F 103/36* | (2006.01) |

(52) U.S. Cl.
CPC .............. *C02F 1/30* (2013.01); *B01J 23/881* (2013.01); *B01J 35/004* (2013.01); *C02F 1/722* (2013.01); *C02F 1/725* (2013.01); *C02F 2101/10* (2013.01); *C02F 2101/308* (2013.01); *C02F 2101/322* (2013.01); *C02F 2101/327* (2013.01); *C02F 2101/38* (2013.01); *C02F 2103/003* (2013.01); *C02F 2103/14* (2013.01); *C02F 2103/30* (2013.01); *C02F 2103/343* (2013.01); *C02F 2103/365* (2013.01); *C02F 2305/10* (2013.01)

(58) Field of Classification Search
CPC ....... C02F 1/30; C02F 1/72; C02F 1/46; B01J 23/88; B01J 35/00
See application file for complete search history.

(56) References Cited

U.S. PATENT DOCUMENTS 9,561,530 B1 * 2/2017 Kinsman ................. C02F 1/705
9,737,880 B2 * 8/2017 Hill ........................ B01J 35/004

FOREIGN PATENT DOCUMENTS

WO    WO-2018025208 A1 * 2/2018 ............. B01J 37/02

OTHER PUBLICATIONS

Geletti et al "Homogeneous Light-Driven Water Oxidation Catalyzed by a Tetraruthenium Complex with All Inorganic Ligands", Department of Chemistry and the Cherry L. Emerson Center for Scientific Computation, Emory University, Feb. 22, 2009, 2 pages.
Song et al "K7[Co111Co11 (H20)W11O39]: A Molecular Mixed-Valance Keggin Polyoxometalate Catalyst of High Stability and Efficiency for Visible Light-Driven Water Oxidation", Energy & Environmental Science, Royal Society of Chemistry, 2013, 6, pp. 1170-1184.
Khan et al. "Recent Advancements in Engineering Approach Towards Design of Photoreactors for Selcective Photocatalytic CO2 Reduction to Renewable Fuels", Journal of CO2 Utilization Elsevier, 29, 2019, pp. 205-239.
Lu et al. "2d Transition-Metal-Dichalcogenide-Nanosheet-Based Composites for Photocatalytic and Elecgtrocatalytic Hydrogen Evolution Reactions", Advanced Materals, 2016, 28, pp. 1917-1933.
Batista et al. "Solar Photocatalytic Application of NbO2OH as Alternative Photocatalyst for Water Treatment", Science of Total Environment 596-597, 2017, pp. 79-86.
Kim et al., "Hydrogen Producing Water Treatment Through Solar Photocatalysis", Royal Society of Chemistry, 2010, 1, pp. 1042-1045.
Zhang et al. "Emerging S-Scheme Photocatalyst", Advanced Materials, 2022, 14 pages.
Low et al. "A Review of Direct Z-Scheme Photocatalysts", Small Methods, 2017 21 pages.
Malato et al. "Decontamination and Disinfection of Water by Solar Photocatalysis: The Pilot Plants of the Plataforma Solar de Almeria", Materials Science in Semiconductor Processing, Elsevier, 2015, 9 pages.

(Continued)

Primary Examiner — Cameron J Allen
(74) Attorney, Agent, or Firm — Lowenstein Sandler LLP

(57) ABSTRACT

Use of Keplerate type polyoxomolybdates of the general structure $Mo_{72}M_{30}$, wherein M is selected from the group consisting of Fe, Cr, V or $Mo_2$, for decontaminating aqueous media (water) from inorganic and organic pollutants.

11 Claims, No Drawings

(56) References Cited

OTHER PUBLICATIONS

Nahar et al. "Advances in Photocatalytic CO2 Reduction with Water: A Review", Materials, 2017, 10, 629, 26 pages.
Kudo et al. "Heterogeneous Photocatalyst Material for Water Splitting", Royal Society Reviews, Chemical Society Review, 2009, 28, 27 pages.
Zheng et al. "In Situ Grown Pristine Cobalt Sulfide as Bifunctional Photocatalyst for Hydrogen and Oxygen Evolution", Advanced Functional Materials, 2017, 27, 1605846, 11 pages.

* cited by examiner

USE OF KEPLERATE TYPE POLYOXYMOLYBDATES FOR DECONTAMINATING AQUATIC ENVIRONMENTS

CROSS-REFERENCE TO RELATED APPLICATION(S)

This application is a national phase of International Application No. PCT/EP2018/076551, filed on Sep. 29, 2018, which claims the benefit of European Patent Application No. 17195084.3, filed on Oct. 5, 2017. The contents of these applications are hereby incorporated by reference in their entirety.

FIELD OF THE INVENTION

The present invention relates to the use of Keplerate type polyoxomolybdates of the general structure $Mo_{72}M_{30}$ for decontaminating aquatic environments form organic and inorganic pollutants.

Pollutants with a potential hazard for the environment and humans enter the aquatic environment through different channels. Examples of such pollutants are organic compounds, dyes and pharmaceutically active ingredients.

Process water from textile finishing, chemical, petrochemical and pharmaceutical production as well as wastewaters from hospitals or the like may contain contaminants which are not available for biological water treatment. These contaminants require a pre-treatment prior to the introduction to a biological water treatment.

Advanced oxidation methods such as the combined use of UV radiation and oxidizing agents (such as e.g. hydrogen peroxide) have been used in such cases. UV treatment is also used in the treatment of wastewaters in textile finishing processes or for the treatment of washing liquors in exhaust gas washers.

All the known methods are based on using radiation from high energy radiation sources outside the visible spectrum of sun light, i.e. UV-light below 400 nm and use preferably UV-active photocatalytic materials based on titanium dioxide due to the ready availability and low costs of titanium dioxide. However, the efficiency of titanium dioxide is not satisfactory in a number of cases.

Hiskia et al., Int. J. Environ. Anal Chem., 86, 3-4, 233-242 (2006) describe the polyoxometalate (POM) photocatalysis for decontaminating the aquatic environment. It is outlined that POMs, upon excitation with near-visible or UV-light, become powerful oxidizing reagents which are capable of destroying a great variety of organic pollutants in aqueous systems. Photolysis of POMs with visible and near UV light results in the formation of an excited state acting as a strong oxidant that oxidizes and in many cases, mineralizes (i.e. decompose to carbon dioxide and water) organic substrates including organic pollutants. Keplerate type POMs are not envisaged.

A polyoxometalate (abbreviated POM) is a polyatomic ion, usually an anion, that consists of three or more transition metal oxyanions linked together by shared oxygen atoms to form closed 3-dimensional frameworks. The metal atoms are usually group 6 (Mo, W) or less commonly group 5 (V, Nb, Ta) transition metals in their high oxidation states.

Polyoxomolybdates, i.e. polyoxometalates based on Mo as transition metal have been described in great variety in the literature. The most common unit for polymolybdates is the octahedral $\{MoO_6\}$ unit, often distorted by the Mo atom being off-centre to give one shorter Mo—O bond. Some polymolybdates contain pentagonal bipyramidal units.

Polyoxomolybdates containing a pentagonal $\{(Mo)Mo_5\}$ building block, comprising a central pentagonal bipyramidal $\{MoO_7\}$ group with six surrounding $\{MoO_6\}$ octahedra is one such example described in the literature.

The highly symmetric $[(pent)_{12}(link)_{30}]$ type spherical clusters, such as the $\{Mo_{132}\}$ type nanospheres, are comprised of 12 pentagonal $\{(Mo)Mo_5\}$ groups (pent) connected by 30 $\{Mo_2\}$ groups acting as linkers (link).

The number twelve, an emblem of icosahedral symmetry, is significant in the context of two Platonic solids: the icosahedron and dodecahedron, the latter having 12 faces, the former having 12 vertices.

The linker in these systems (the Mo group) may be replaced by other metal atoms such as Fe, Cr or V, leading to POMs commonly designated by the formulae $Mo_{72}Fe_{30}$, $Mo_{72}Cr_{30}$ and $Mo_{72}V_{30}$ and commonly referred to as Keplerate molecules.

Keplerates are a class of high-symmetry molecules. Some of the metals lie on the vertices of a Platonic solid (e.g. cube, octahedron, tetrahedron, icosahedron) and the others on the vertices of an Archimedean solid (e.g. a cuboctahedron).

Keplerate type polyoxymolybdates $Mo_{72}Fe_{30}$ have first been synthesized and described by Prof. Müller and his group at the University of Bielefeld around 2000 and a number of reviews authored or co-authored by Prof. Müller relating to polyoxomolybdates have been published (e.g. A. Müller, P. Gouzerh, Chem. Soc. Rev. 2012, 41, 7431-7463 (2012) or A. Müller, S. Roy, Oxomolybdates: From structures to functions in a new era of nanochemistry, in "The Chemistry of Nanomaterials: Synthesis, Properties and Applications", Ed. C. N. R. Rao, A. Müller, A. K. Cheetham, Wiley VCH, 2004). The use of Keplerate type POMs for decontaminating the aquatic environment has not been described or suggested in reported reviews.

Zang et al., Inorg. Chem. Comm., Vol. 14, no 4, 590-593 (2011) discloses the degradation of Rhodamine B with a polyoxomolybdate $Mo_{72}Fe_{30}$ under ultraviolet radiation.

Zhou et al., RSC Adv. Vol. 4, no 97, 54928-54935 (2014) disclose the use of a polyoxomolybdate $Mo_{72}(Mo_2)_{30}$ for the degradation of Rhodamine B under ultraviolet radiation.

CN 102 210 917 also discloses the use of a polyoxomolybdate $Mo_{72}(Mo_2)_{30}$ for the degradation of Rhodamine B under ultraviolet radiation.

It was an object of the present invention to provide a new use of Keplerate type polyoxomolybdates for the decontamination of aquatic environments.

This object has been achieved with the use in accordance with claim 1 and the process in accordance with claim 13.

Preferred embodiments of the present invention are described in the dependent claims and in the detailed description hereinafter.

In accordance with the present invention Keplerate type polyoxomolybdates (POMs) of the general structure $Mo_{72}M_{30}$, wherein M is selected from the group consisting of $Fe^{III}$, $Cr^{III}$, $V^{IV}$ or $Mo^{V}_2$, in combination with electromagnetic radiation are used for decontaminating aquatic environments from inorganic and organic pollutants.

The term Keplerate, when used herein is used to designate molecular structures that contain Platonic and Archimedean solids (spanned by equivalent sets of atoms) according to the principle one inside another like in Russian dolls.

Keplerate type poyloxomolybdates suitable for the use in accordance with the present invention have been described in the literature, e.g. in A. Müller et al., Angew. Chem. Int. Ed., 39, 1612-1614 (2000), A. Müller et al., Solid State Sci., 2, 847-854 (2000) and A. Müller et al., Chem. Soc. Rev. 41, 7431-7463 (2012) to give only a few examples.

All the Keplerate type polyoxomolybdates for use in the present invention may be represented by the general structure $pent_{12}link_{30}$ wherein pent designates a pentagonal (Mo) $Mo_5$ unit and link is the metal M as defined hereinbefore. The pentagonal groups are linked by the linkers.

The core structure of the POMs used in accordance with the present invention wherein M is selected from Fe, V or Cr is an icosidodecahedron. The magnetic ions M occupy the vertices of said icosidodecahedron. An icosidodecahedron comprises 12 pentagons (formed by the $Mo(Mo_5)$ units and 20 triangles (formed by the linker atoms M).

The POM wherein M is $Mo^V$ forms a truncated icosahedron with 12 pentagons and 20 hexagons formed by $Mo^V$.

The POMs used in accordance with the present invention, formed by 12 pentagonal $Mo(Mo_5)$ units linked by 30 mono- or dinuclear linkers comprise a nanoscaled capsule cavity and 20 size-tunable specific nanopores of the type $[M_nO_n]$ (for example with n=6 or 9) which can act as substrate specific receptors. The cavity can even house smaller polyoxometalates to form a supramolecular nanocomposite. If M is a ferromagnetic metal molecular nanoantiferromomagnets are obtained.

The nano-objects of the type $Mo_{72}M_{30}$ can be crosslinked in a solid state reaction to form layers by following an inorganic polycondensation reaction.

Freshly filtered crystals show a rapid water loss and the possibility to form a related one-dimensional chain (paramagnetic Keplerate necklaces) from spherical nanospheres also exists.

Inside the cavities, which can be hydrophilic or hydrophobic, different types of reactions can be performed at well defined sites.

The POMs use in accordance with the present invention thus are interesting because of their stability, size, solubility, giant cavities, nanosized changeable pores, unique surfaces, unusual electronic structures and the abundance of magnetic centres (if M is a ferromagnetic metal) in a variety of topologies. Most of the clusters can be manipulated whilst keeping the robust nanoscopic oxymolybdate skeleton intact. Encapsulation of the giant clusters with surfactants allows one to produce films and monolayers.

Further information on the properties of POMs used in accordance with the present invention is given in A. Müller, S. Roy, Oxomolybdates: From structures to functions in a new era of nanochemistry, in "The Chemistry of Nanomaterials: Synthesis, Properties and Applications" (Eds. C. N. R. Rao, A. Müller and A. K. Cheetham), Wiley-VCH 2004 and in A. Müller, P. Gouzerh, Chem. Soc. Rev. 2012, 41, 7431-7463 (2012).

General information for the synthesis of Keplerate POMs can also be found in the supporting information of B. Yadollahi et al, Catal. Commun. 66, 107-110 (2015).

Processes for the synthesis of the POMs used in accordance with the present invention have been described in A. Müller et al., Angew. Chem. Int. Ed. 383238-3241 (1999), A. Müller et al., Angew. Chem. Int. Ed. 119, 6218-6222 (2007), and A. Müller et al. Angew. Chem. Int. Ed. 37, 3360-3363 (1998).

In accordance with a preferred embodiment M is $Fe^{III}$.

A particularly preferred polyoxomolybdate in accordance with the present invention is $Mo^{VI}_{72}Fe^{III}_{30}O_{252}(CH_3COO)_{12}\{Mo^{VI}_2O_7(H_2O)\}_2\{H_2Mo^{VI}_2O_8(H_2O)\}(H_2O)_{91}]x$ appr. 150 $H_2O$ which has been described in A. Müller et al., Angew. Chem. Int. Ed., 39, 1612-1614 (2000).

Other examples of suitable Keplerate POMs for use in accordance with the present invention are $Na_8K_{14}[(VO)[(Mo^{VI})Mo^{VI}_5O_{21}(H_2O)_3\{Mo^{VI})Mo^{VI}_5O_{21}(H_2O)_3(SO_4)_2\{V^{IV}O(H_2O)_{20}\{V^{IV}O\}_{10}(\{KSO_4\}_5)_2x$ 150 $H_2O$ $(Mo_{72}V_{30})$ and $[\{Na(H_2O)_{12}\}[Mo^{VI}_{72}Cr^{III}_{30}O_{252}(CH_3COO)_{19}(H_2O)\}]_{94}x$ 120 $H_2O$ $(Mo_{72}Cr_{30})$. Information on their synthesis is given in Yadollahi et al, RSC Adv., 70424-70428 (2015) to which reference is made for further details.

The polyoxomolybdates are used for the decontamination of aqueous environments from organic and inorganic pollutants.

In principle any kind of aquatic environment can be treated with the POMs in accordance with the present invention, i.e. there are no specific limitations in this regard.

It has been found advantageous in certain cases to treat aquatic environments selected from process waters of textile finishing, dye production, chemical synthesis, petrochemical synthesis or pharmaceutical synthesis or from waste water collecting systems in urban environments or hospitals in accordance with the present invention.

Process waters from textile finishing, chemical, petrochemical and pharmaceutical production may contain contaminants which cannot be removed by biological or chemical water treatment and which possess a hazard for the environment. By treating this kind of aquatic environments with POMs in accordance with the present invention, it is possible to remove the contaminants to a significant degree and thus to eliminate or at least to reduce the risk associated with such contaminants in aqueous media.

The pollutants may be inorganic or organic in nature and can be e.g. pharmaceutically active ingredients, agriculturally active ingredients, peptides or aromatic compounds, preferably pharmaceutically or agriculturally active ingredients. Another group of pollutants are dyes.

One of the advantages in accordance with the present invention is the fact that the pollutants in many cases are basically mineralized, i.e. decomposed to carbon dioxide and water. Known oxidative processes in certain cases decompose the pollutant to intermediate or decomposition products still posing a hazard. It is obvious that a decomposition of the entire carbon chain to carbon dioxide and water eliminates any potential issue with intermediate or decomposition products and thus the use in accordance with the present invention provides an important benefit over known processes in this regard.

Just by way of example, the use in accordance with the present invention may be applied to aquatic environments containing as pollutants urea, ureic acid, phenanthrolines, peptides, bacteria, benzene, pyrene, acetonitrile, hematoporphyrins, melamine, fluorinated organic compounds such as pentafluophenol, nitrogen containing aromatic compounds such as p-nitrophenol, triethanolamine or dyes such as potassium ferrocyanate, methylene blue, crystal violet, Fe(III)phthalocyanine chloride or methylviologen.

As stated above, this list is only exemplary; there is no specific limitation as the POMs oxidize a vast majority of organic and inorganic pollutants.

In accordance with a preferred embodiment, the POMs are used in combination with an oxidizing agent.

Suitable oxidizing agents are e.g. hydrogen peroxide, oxygen, or persulfates, of which the latter are preferred. Particularly, the alkali metal and the alkaline earth metal persulfates such as sodium persulfate, potassium persulfate or calcium persulfate are preferred due to their good availability. The skilled person will select the suitable oxidizing agent based on his professional experience and on the specific intended application.

The weight ratio of the POMs to the oxidizing agent is not subject to particular limitations and may generally be in the range of from 1:100 to 100:1, preferably in the range of from 1:1 to 1:100 and particularly preferred in the range of from 1:10 to 1:50.

In accordance with a further preferred embodiment, the electromagnetic radiation has a wavelength exceeding 400 nm, preferably exceeding 420 nm. Particularly preferred is electromagnetic radiation in the range of from 401 to 800 nm, i.e. radiation in the visible range of the spectrum.

In accordance with a particularly preferred embodiment, the radiation used is sunlight in which case the term solar photocatalysis is used. This embodiment has the advantage that, compared to radiation of other wavelengths, no energy consuming source for the radiation is necessary as the light of the sun which is abundantly available. Compared to processes where UV radiation with wavelengths of less than 400 nm is necessary and for which specific radiation sources are necessary requiring external energy supply for the generation of the radiation, the use in accordance with the present invention provides the benefit of realizing significant energy savings and the independency of any expensive energy infrastructure.

In accordance with a particularly preferred embodiment, a Keplerate type polyoxomolybdate as described hereinbefore in combination with an oxidizing agent and electromagnetic radiation with a wavelength exceeding 400 nm, preferably in the range of from 401 nm to 800 nm, is used.

A further embodiment of the present invention relates to a process for the decontamination of aquatic environments wherein a Keplerate type polyoxomolybdate of the general structure $Mo_{72}Mo_{30}$ wherein M is selected from the group consisting of Fe, Cr, V or Mo, optionally in the presence of an oxidizing agent like peroxides, is added to the aqueous medium and is irradiated with electromagnetic radiation (e.g. visible sun light) or where the polyoxomolybdate is supported on a solid support and the aqueous medium flows over the loaded carrier while being irradiated with the electromagnetic radiation (e.g. visible sun light). The electromagnetic radiation preferably has a wavelength exceeding 400 nm, more preferably exceeding 420 nm and up to 800 nm.

The solid support for the POMs is not subject to particular limitations and may be chosen from any suitable material which enables immobilization of the POM in a manner which allows a liquid (the aquatic environment) to flow over the supported POM without destructing the structure. The skilled person will chose suitable supports based on his professional knowledge and the specific application situation.

The use in accordance with the present invention allows the decontamination of aquatic environments in an energy saving and economically viable process, in particular when using sunlight as the source of the electromagnetic radiation.

It has been found that most organic and inorganic pollutants can be removed to a degree of 40% or more, preferably 60% or more and most preferably of 80% or more in a time period of from 1 to 24, preferably of from 2 to 20 and in particular of from 3 to 18 hours at ambient conditions, i.e. in a temperature range of from 10 to 50° C., preferably of from 15 to 35° C.

The concentration of the pollutants is not subject to particular limitations and can span over wide ranges, thereby enabling the treatment of a great variety of aquatic environments. Pollutant concentrations in the range of from 100 to 10000 ppm, preferably of from 200 to 5000 ppm have been successfully tested and have provided satisfactory results.

One advantage of the use in accordance with the invention, as mentioned earlier, is the fact that the pollutants are basically converted to harmless products, i.e. the organic backbone structure is efficiently degraded to give primarily carbon dioxide and water as final degradation products which are easy to treat/remove and do not pose health hazards.

The following examples show the broad versatility of the use in accordance with the present invention and of the process in accordance with the invention.

EXAMPLES 0.1 g $Mo_{72}Fe_{30}$, synthesized in accordance with Müller et al. Angew. Chem. Int. Ed. 39, 1612-1614 (2000), 2 grams of sodium persulfate, 20 ml of water and the substrate to be treated in accordance with the data given in Table 1 were irradiated in a quartz glass reactor with a Xe-lamp using a filter excluding radiation of wavelengths of less than 420 nm (thereby filtering out the UV radiation). The decomposition of the substrate was monitored by measuring the $CO_2$ evolution at the upper end of the reactor with CG/MS. In addition, for some of the experiments, chromatographic (HPLC) or spectrophotometric (UV/VIS) measurements were carried out to show the degradation of the substrates. Table 1 shows the results obtained.

TABLE 1

| Pollutant | Conc (ppm) | Duration of irradiation (h) | Degree of degradation % | Analytical method |
|---|---|---|---|---|
| Urea | 2000 | 4 | 96 | GC, GC-MS |
| Ureic acid | 1500 | 8 | 90 | GC, GC-MS HPLC |
| Pharmaceuticals[1] | 600 | 4 | 94 | GC, GC-MS HPLC |
| 1,10-phenanthroline | 1000 | 8 | 86 | GC, GC-MS |
| Tripeptide | 1500 | 4 | 81 | GC, GC-MS |
| *Escherichia coli* | 1000 | 12 | >99 | GC, GC-MS |
| Benzene | 2200 | 12 | 20 | GC-MS |
| Pyrene | 1000 | 12 | 62 | GC-MS |
| Acetonitrile | 2000 | 8 | 35 | GC-MS |
| Potassium hexacyanoferrate | 2500 | 8 | 89 | GC-MS |
| Decamethylcyclopentasiloxane | 4800 | 16 | 41 | GC-MS |
| Silicone oil | 4800 | 18 | 24 | GC-MS |
| Fe(III)pththalocyanine chloride | 1000 | 12 | 87 | GC-MS |
| Hematoporphyrine | 1000 | 12 | 77 | GC-MS |
| Methylene blue | 1000 | 8 | 97 | GC-MS HPLC |
| C.I Basic violet 3 | 1000 | 8 | 81 | GC-MS HPLC |
| Melamine | 2000 | 12 | 83 | GC-MS |

TABLE 1-continued

| Pollutant | Conc (ppm) | Duration of irradiation (h) | Degree of degradation % | Analytical method |
|---|---|---|---|---|
| Pentafluorophenol | 1500 | 8 | 85 | GC-MS HPLC |
| p-Nitrophenol | 1250 | 12 | 74 | GC-MS HPLC |
| Triethanolamine | 2800 | 8 | 42 | GC-MS |
| Methyl viologen | 1000 | 12 | 77 | GC-MS |

[1]Mixture of dichlofenac, carbamezipine and sulfo methaxol (200 ppm each)

The results show that the use of POM in accordance with the present invention can be successfully applied to a great variety of different pollutants.

Example 2

A dye contained in the leafs of canna lilies was extracted and degraded under the conditions in Example 1. The color change observed was proof of the successful degradation.

The POM catalyst can also immobilized, thereby opening the possibility of a continuous operation. Examples showed that a simple LED emitting light in the visible range was sufficient to achieve the desired degradation.

The invention claimed is:

1. A method comprising decontaminating aqueous media from inorganic and organic pollutants with a Keplerate type polyoxomolybdate of the general structure $Mo_{72}M_{30}$, wherein M is selected from the group consisting of Fe, Cr, V or $Mo_2$, in combination with electromagnetic radiation having a wavelength exceeding 400 nm wherein the Keplerate type polyoxomolybdate is used in combination with a persulfate as an oxidizing agent.

2. The method in accordance with claim 1 wherein M is Fe.

3. The method in accordance with claim 1 wherein the electromagnetic radiation is sunlight.

4. The method in accordance with claim 1 wherein the aqueous media are selected from process waters of textile finishing, dye production, chemical synthesis, petrochemical synthesis or pharmaceutical synthesis or from waste water collecting systems in hospitals or urban environments.

5. The method in accordance with claim 1 wherein the pollutant is selected from organic pollutants.

6. The method in accordance with claim 5 wherein the organic pollutant is selected from pharmaceutically active ingredients, agricultural active ingredients, peptides or aromatic organic compounds.

7. The method in accordance with claim 5 wherein the organic pollutant is selected from pharmaceutically active ingredients and agriculturally active ingredients.

8. The method in accordance with claim 1 wherein the pollutant is selected from inorganic pollutants.

9. The method in accordance with claim 1 wherein the pollutant is a dyestuff.

10. A process for the decontamination of aqueous environments, the process comprising:
adding a Keplerate type polyoxomolybdate of the general structure $Mo_{72}M_{30}$, wherein M is selected from the group consisting of Fe, Cr, V or $Mo_2$, and a persulfate as an oxidizing agent to the aqueous environment forming an aqueous solution/slurry, and
thereafter, irradiating the aqueous solution/slurry with electromagnetic radiation having a wavelength exceeding 400 nm.

11. A process for the decontamination of aqueous environments, the process comprising:
flowing an aqueous solution comprising a persulfate as an oxidizing agent over a selected carrier while irradiating the aqueous solution with electromagnetic radiation having a wavelength exceeding 400 nm,
wherein the selected carrier comprises a Keplerate type polyoxomolybdate of the general structure $Mo_{72}M_{30}$, wherein M is selected from the group consisting of Fe, Cr, V or $Mo_2$, supported on a solid support.

* * * * *